Dec. 30, 1930.   S. M. FRIEDE ET AL   1,786,486
MATCH MACHINE
Filed May 19, 1928   7 Sheets-Sheet 5

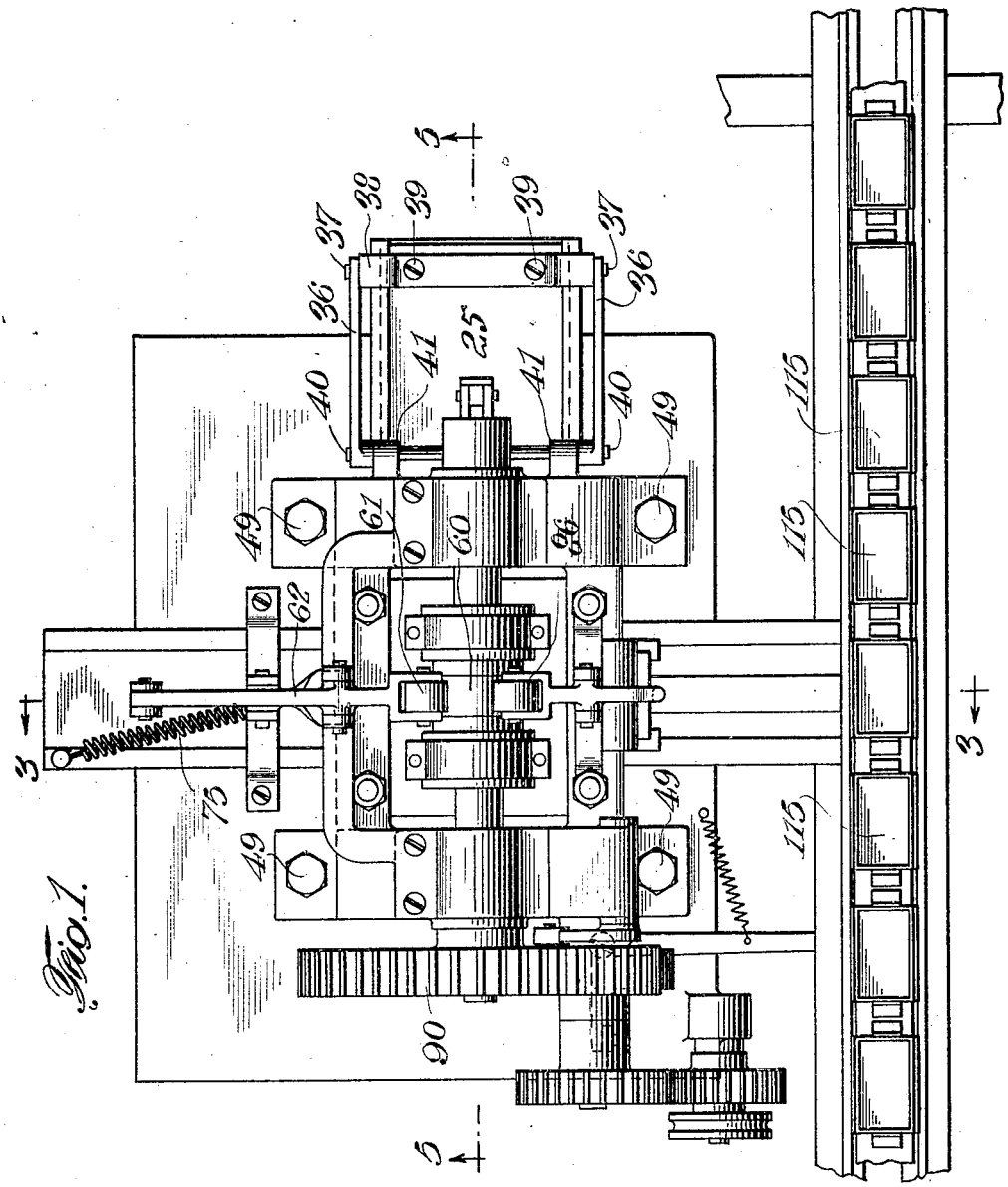

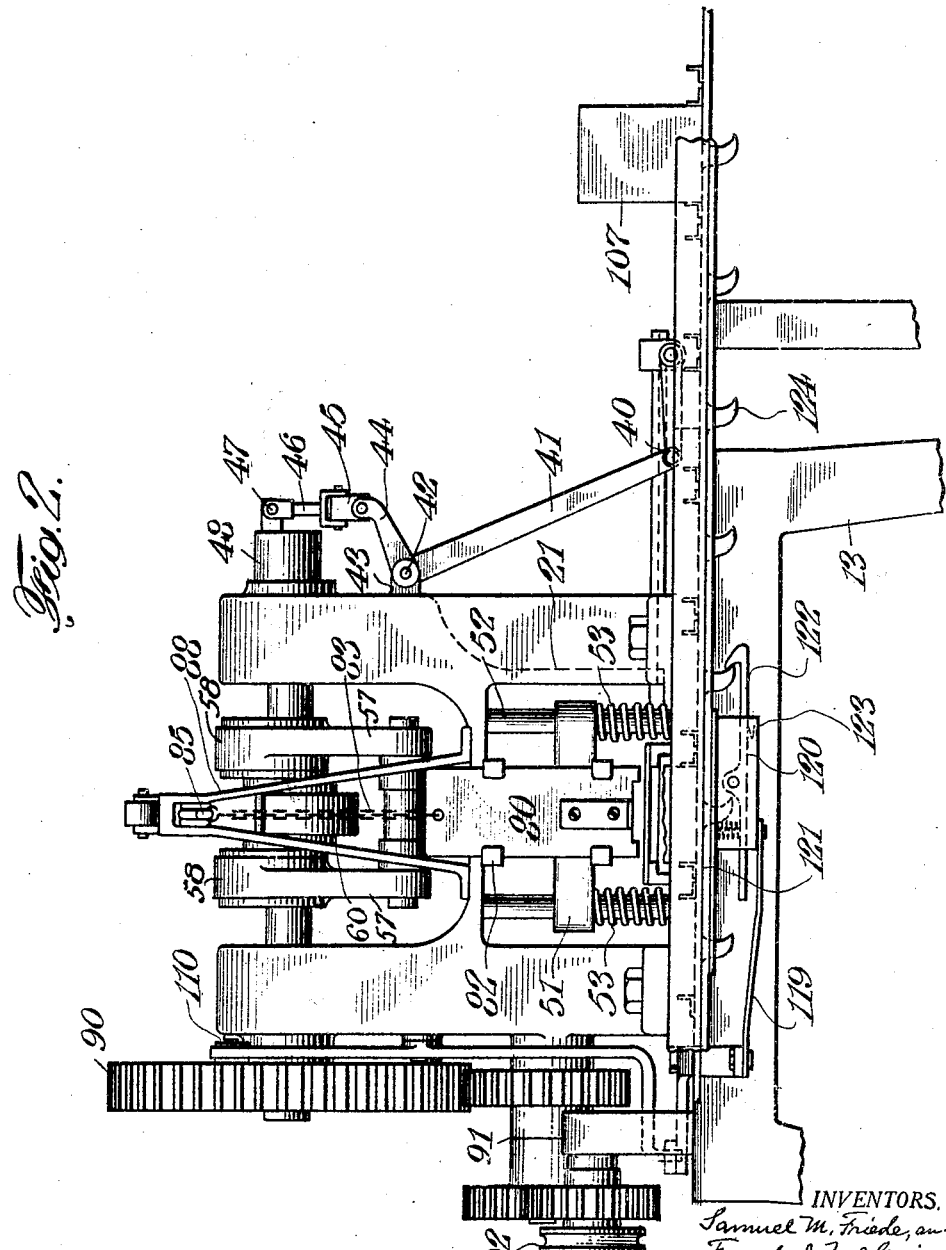

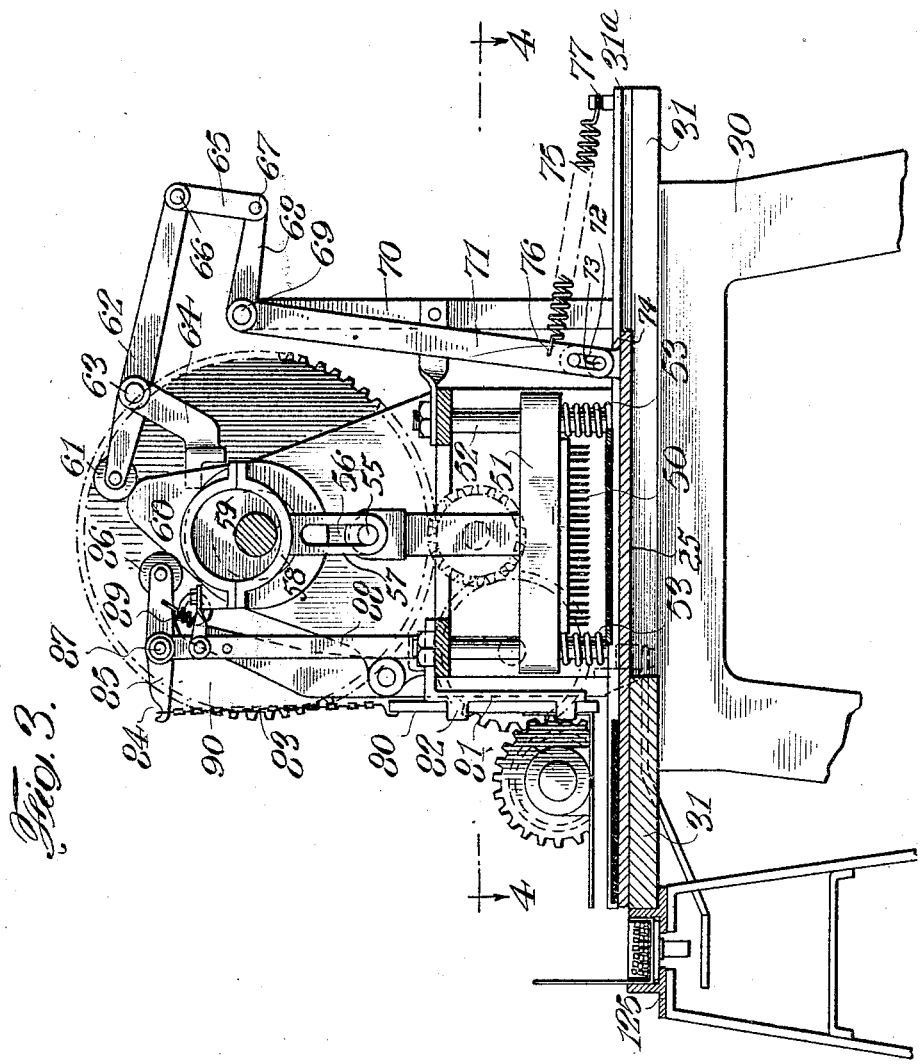

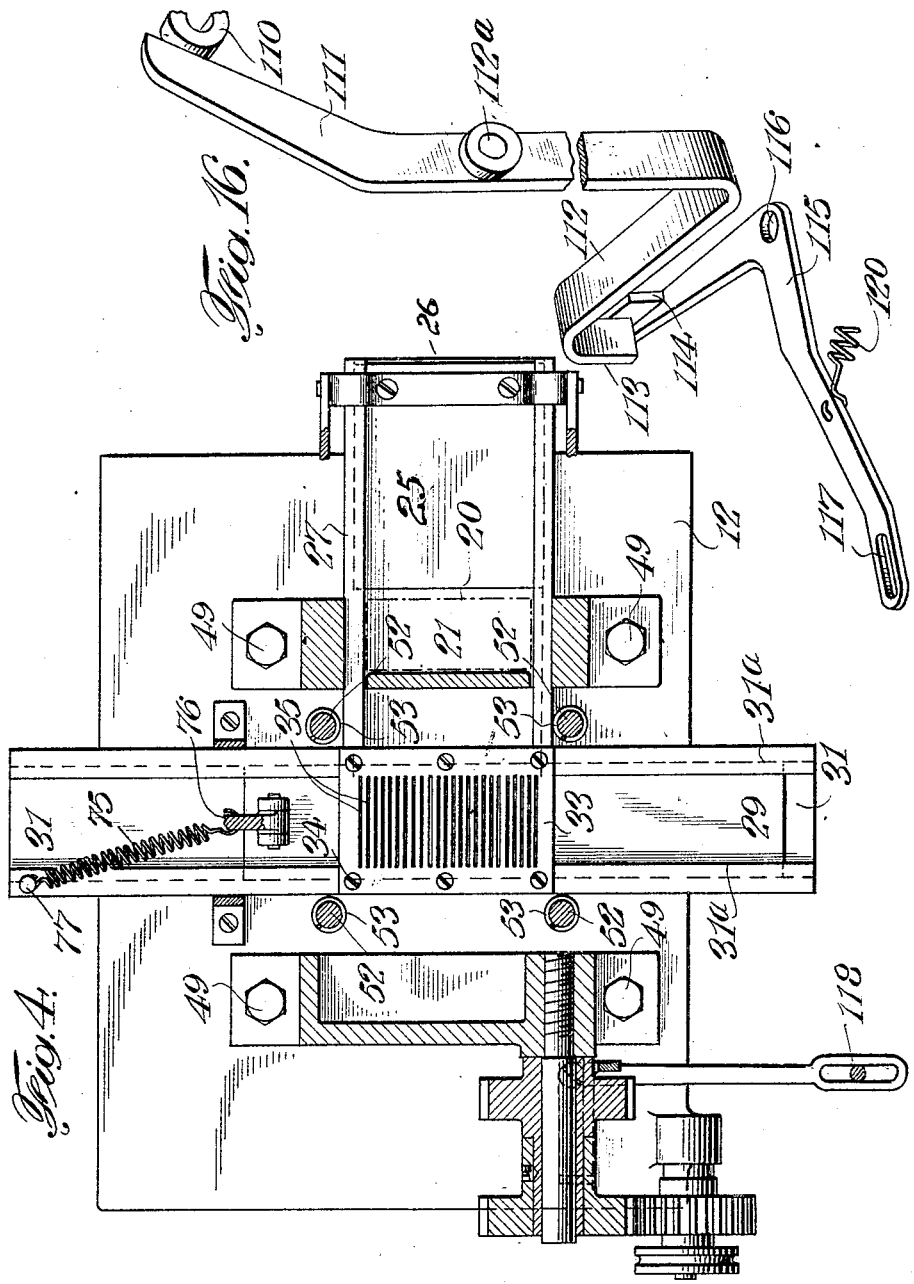

INVENTORS.
Samuel M. Friede and
Frank J. McGuire.
BY Hoguet V Neary.
ATTORNEYS.

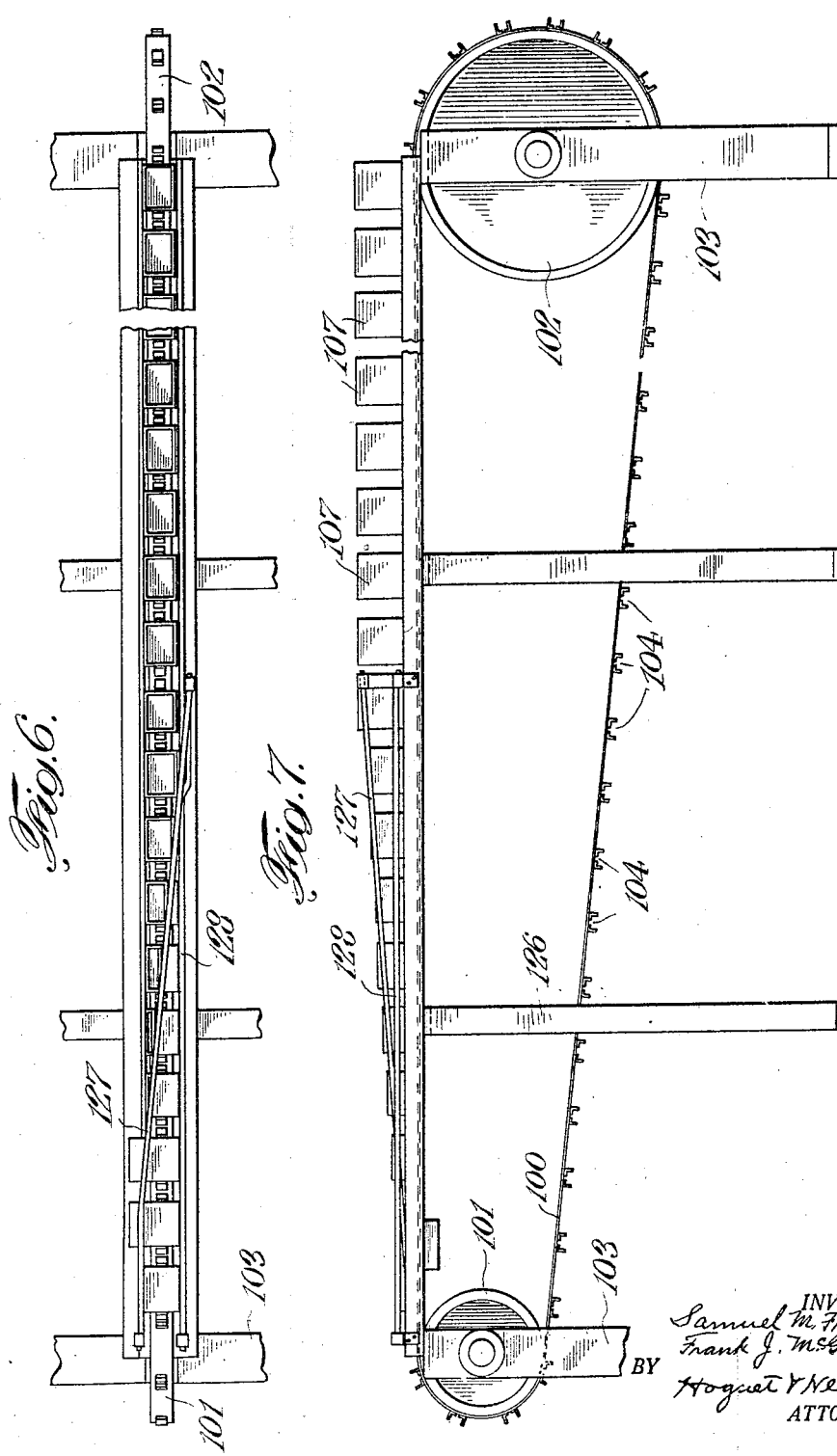

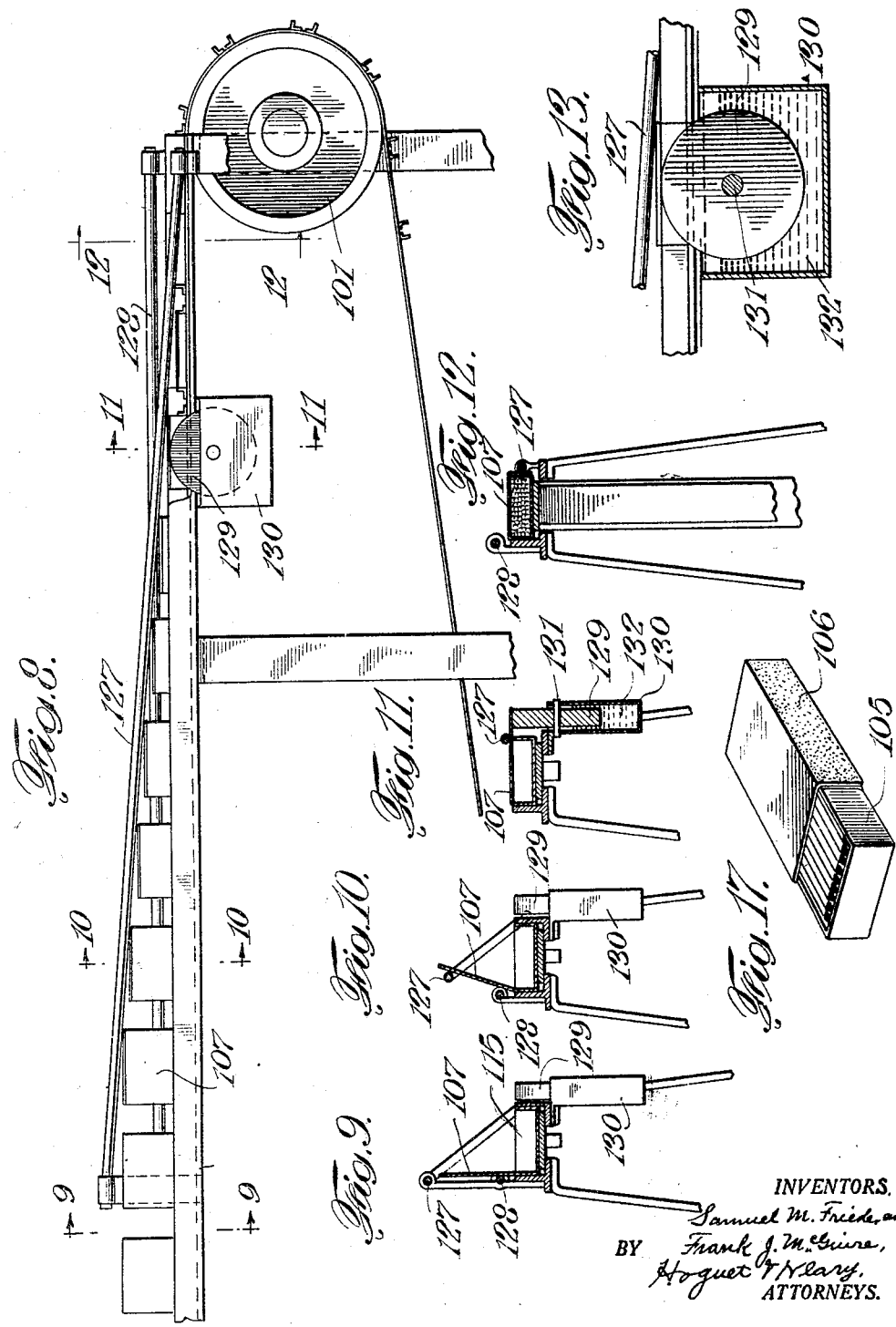

Patented Dec. 30, 1930

1,786,486

UNITED STATES PATENT OFFICE

SAMUEL M. FRIEDE AND FRANK J. McGUIRE, OF SARASOTA, FLORIDA

MATCH MACHINE

Application filed May 19, 1928. Serial No. 278,972.

This invention relates to an improved machine for manufacturing matches and for loading the matches in match boxes, and to a novel method for the manufacture of the matches.

The present invention provides for forming and cutting matches from veneers or slabs of material. The veneer or slab pieces may be either of wood or cardboard. In the first case, the veneers are cut into individual wood matches, while in the latter case they are cut into combs of matches, often of ten or more cardboard matches each. Prior to the match cutting operation, the veneers or slabs are impregnated and dried and are next dipped into paraffin. The edges of the veneers are then dipped into a heading composition which is applied along an entire edge of each veneer piece. The veneers are now in condition to be placed in the machine and cut into matches, either individual or in combs.

The machine generally comprises means for automatically feeding the veneers into the machine, means in the machine for cutting the veneers into matches and means for automatically ejecting the matches into trays or boxes. The machine also includes means for automatically feeding the trays into the machine and into position to be conveniently filled with the matches, and means for automatically sealing the covers or shucks on the trays, so that the match boxes leave the machine filled with matches and ready for dispensation and sale.

The operations in the machine are nicely timed and synchronized, the machine is comparatively simple in construction and is reliable in service, and matches may be made and loaded in the boxes economically and efficiently thereby.

Reference is to be had to the accompanying drawings, showing by way of illustration and example a preferred embodiment of the invention and in which:

Figure 1 is a plan view of a machine constructed in accordance with the present invention;

Figure 2 is a front elevational view of the machine;

Figure 3 is a sectional elevational view of the machine taken as on the line 3—3 of Figure 1;

Figure 4 is a sectional plan view on line 4—4 of Figure 3;

Figure 5 is a sectional elevational view on line 5—5 of Figure 1;

Figure 6 is an isolated view in plan of the match box conveying apparatus preferably employed in the machine;

Figure 7 is an isolated view in front elevation of said conveying apparatus;

Figure 8 is an isolated view in back elevation of a portion of said conveying apparatus, illustrating the adhesive applying means for the covers or shucks of the match boxes preferably utilized in the machine;

Figures 9–12 are transverse sectional views taken respectively on the lines 9—9, 10—10, 11—11, and 12—12 of Figure 8;

Figure 13 is an isolated side elevational view of the adhesive applying means;

Figure 14 is a side elevational view showing a fragment of the conveying apparatus and operating means therefor;

Figure 15 is a transverse sectional view taken as on the line 15—15 of Figure 14;

Figure 16 is an isolated perspective view showing the operating means for a conveying apparatus preferably employed; and Figure 17 is a perspective view of a match box with matches manufactured and filled by the machine of the present invention.

Referring now more particularly to the drawings, we will first describe the means for automatically feeding the veneer pieces, which are each headed along one edge, into the machine. As seen in Figure 5, the headed veneers 20, are disposed in stacked formation in a recess 21 formed in a portion 22 of the frame of the machine, which portion also provides near the upper end thereof bearings 23 for the main shaft 24 of the machine. The bottom veneer in the stack is slid out from under the stack and is fed into the machine and to this end we preferably employ a shuttle 25.

The stack of veneers are placed upon the platform 26 which is provided with guide members 27 (see Figure 4) for guiding the veneers for substantial rectilinear movement in being fed into the machine and for also guiding the shuttle 25 for similar movement. The shuttle acts against the lowest veneer in the stack and pushes this veneer from under the stack and thru a slot 28 into the machine and on to a carrier plate 29. This carrier plate 29 is mounted for rectilinear movement in a horizontal plane and substantially at right angles to movements of the shuttle and to this end is positioned in a stationary bed 31 providing side guides 31a for guiding the carrier plate 29 in its movements. The bed 31 is mounted in the lower frame portion 30 of the machine and the upper and lower frame portions are preferably attached as by bolts 49 or similar means. One of the guides 31a has a cutaway portion 32 (see Figure 5) to permit the veneer passing on to the carrier plate and underneath a stationary plate 33 which is attached to the top of the bed 31 or side guides 31a as by screws 34 or similar fastening means and is provided with slots 35 thru which may pass cutting blades or knives as more particularly described hereinafter for cutting the veneer beneath the slotted plate and fed under the same by the shuttle into matches, either of the individual wood kind or of the cardboard comb variety.

The means for sliding the shuttle to cause it to feed the veneers and after the feeding of a veneer for withdrawing it into the position shown in Figure 5 ready to feed a fresh veneer will now be described.

A pair of links 36 are disposed along opposite sides of the shuttle and are pivoted at their ends at 37 to a transverse member 38 associated with the shuttle and attached thereto as by means of screws 39 or the like. The other ends of the links are pivoted at 40 to links 41 which are mounted at their other ends on a rod 42 positioned in bearings 43 attached to the side of the frame of the machine. This rod is oscillated by a crank arm 44, the free end of which has a connection thru a flexible joint 45 with a connecting rod 46. The end of the connecting rod is eccentrically mounted and pivoted at 47 on the side of a block 48 on the main shaft 24 of the machine.

The main shaft is continuously rotating during the operation of the machine and as it rotates, it communicates a rocking or oscillating movement to the crank arm 44 thru the connecting rod 46 by reason of the eccentric pivot thereof on the block 48. The rocking movement of the arm 44 is communicated to the links 41 and a reciprocating or back and forth sliding movement is thereby imparted to the shuttle 25, causing the shuttle to push or feed the veneers into the machine as above described. The slot 28 thru which the lowest veneer is shoved by the shuttle is of such a size as to permit only the passage of a single veneer and thus the danger of more than one veneer being fed into the machine at the same time is eliminated.

The veneer which is fed under the slotted plate 33 is now cut into matches by cutting blades or knives 50 which pass down thru the slots in the plate 33, thereby to cut or slice the veneer into the matches. The cutting blades are mounted on a cross-head 51 which in turn is supported for vertical movement on posts 52, spring 53 being employed for biasing the cross-head and the knives to their elevated position. The springs preferably encircle the posts and are of the coiled type. The cross-head with the cutting blades are reciprocated vertically in synchronism with the feeding of the veneers and movements of the shuttle so that the blades descend thru the slots 35 in the plate 33 when a veneer is beneath said plate and is stationary beneath the plate. As the headed portions of the veneer cards are of the composition used in making safety matches there is no danger of ignition when the blades cut through.

For obtaining the synchronous movement of the cross-head and blades, the movement is preferably derived from the main shaft 24 of the machine which also provides the movement for and operates the shuttle. The cross-head 51 has a vertical member 54 projecting upwardly therefrom and carrying a pin 55 at its upper end which engages in slots 56 in the arm 57 of eccentric yokes 58 which are mounted on and encircle eccentrics 59 on shaft 24. The eccentrics acting on the yokes communicate the vertical reciprocating movement to the cross-head and blades so that the blades descend on a veneer beneath the slotted plate 33 to cut the veneer into matches, and the movement of the cross-head and its knives is nicely timed and synchronized with the movement of the feeding shuttle.

After the veneer beneath the plate 33 has been cut into matches, the matches are ejected from beneath said plate so as to leave the space beneath the same free to receive a new veneer for cutting. The matches are removed by the carrier plate 29, which has been stationary while the veneer was fed on to it and beneath the slotted plate and cut into matches, but is now moved to carry the matches from under the slotted plate 33. The movement of the carrier plate is also preferably derived from the main shaft 24 so as to be nicely timed with the movements of the feeding shuttle and cutting blades.

A cam 60 is preferably positioned on shaft 24 and between the eccentrics 59 and serves to operate a roller 61 which rests upon the periphery of the cam. The roller is carried on one end of a lever 62 which is pivoted at 63 and the pivot carried by a stationary support or bracket 64 rigidly supported on a portion of the frame of the machine. The other end of the lever has pivoted thereto at 66 a link 65, the other end of which link is pivoted at 67 to the short arm of a bell-crank lever 68, which bell-crank lever is pivoted at 69 to a yoke or bracket 70 carried on the frame of the machine and over the carrier 29. The free end of the long arm 71 of the bell-crank lever is provided with a slot 72 in which fits a pin 73 carried on a projection 74 of the carrier plate 29. A coil spring 75 is preferably connected at one end to the long arm 71 of the bell-crank lever and at the other end to a stationary point or post 77 on the bed 31. A single key 78 may be used for fastening the cam 60 and eccentrics 59 to the shaft 24.

The spring 75 serves normally to bias the carrier plate to its retracted position, in which position it is stationary and receives the veneer as it is fed by the shuttle. As soon, however, as the veneer has been cut into matches, the carrier plate is moved forward in the guides 31a of the bed 31 and carries the matches with it from beneath the slotted plate 33. This movement of the carrier plate is caused by the cam 60 and is transmitted from said cam to the carrier plate thru the system of levers and linkages described above. This particular mechanism is, of course, purely optional and other means for providing movement for the carrier plate may be used without departing from the invention.

After the carrier plate has carried the cut matches forward as shown in Figure 3 from under the slotted plate 33, the carrier plate is retracted to its former position underneath the slotted plate to which position it is biased by the spring 75 and maintained stationary in its retracted position while a new veneer is fed on to the same and cut into matches. The cut matches are left by the carrier plate on the front portion of the bed 31 of the machine. As the carrier plate is retracted, it is slid from under the cut matches which fall upon the bed 31, and as the carrier plate is advanced again, it strikes the matches on the bed and projects them into a tray, as presently described. In order to insure that the matches are left on the bed and are not carried back with the carrier plate upon retraction of the latter, we provide a stop which is interposed in the path of said matches as the carrier plate is being withdrawn and retracted.

The stop may take the form of a bar 80 which is movably mounted in a support 81 having fingers 82 embracing the sides of the bar so that the bar is guided for vertical movement. A chain 83 or the like supports the bar in an elevated position except when the carrier plate is being retracted. The upper end of the chain fits in a notch 84 at the end of a lever 85, the other end of which carries a roller which bears against the cam 60 and is operated thereby. The lever may be pivoted at 87 in a yoke or other supporting member 88. The lever is biased by a spring 89 to a position such that the bar 80 is normally maintained in its elevated position.

As the carrier plate is about to be withdrawn and retracted, the roller 86 strikes the elevated portion of the cam 60 with the result that the plate 80 is lowered and acts as a stop to prevent the matches on the end of the carrier plate being retracted with the carrier plate and to insure that they fall upon the bed 31. After the carrier plate has been withdrawn and retracted, the bar 80 is again elevated where it is maintained until the cycle of operations is completed once more and the carrier plate is about to be retracted again, so that the bar does not interfere with the advance of the carrier plate or matches which it carries forward. When the carrier plate is again advanced, it strikes the matches on the bed 31 and projects them from the bed into a tray, thereby filling the tray with the matches.

It should be noted that all of the operations of the machine thus far described are automatic, and nicely timed and synchronized, because the movements of all of the elements are derived from the main shaft 24. This shaft is continuously driven at a constant revolution and to this end may have a large gear 90 on one end thereof which is driven thru a gear train 91 of any suitable kind from a pulley 92, the parts and gears being conveniently mounted on the frame of the machine. The pulley in turn is driven thru a belt from an electric motor or other machine. (Not shown.)

The machine also preferably comprises means for automatically filling trays with the matches projected from the end of the bed 31. For this purpose, a continuous conveyor or belt 100 may be employed, which belt passes over pulleys 101 and 102. The pulleys are supported on stands or brackets 103 positioned on the floor or other support. As best shown in Figures 6 and 7, the travelling belt may have spring catches 104 on the outside thereof between which the trays are engaged so that the trays travel along with the belt and come in front of the bed 31 in open position. The tray itself is preferably in the form of a box 105 and the cover or shuck 106 is of customary formation when complete as shown in Figure 17. The shuck or cover is, however, placed on the travelling belt between the spring fingers or snap catches 104 with the flap 107 open and the tray or box 105 embraced within the cover or shuck so that the open top of the tray is exposed to receive the matches projected thereinto off the bed 31.

We provide means for driving the travelling belt intermittently and in synchronism with the operation of the machine so that every time the carrier 29 is advanced to eject the charge of matches from the bed 31, there is an open tray to receive the matches projected by the carrier from the bed 31, as shown in Figure 3. In order to derive the intermittent and synchronous movement of the belt, we may provide a stud 110 on the side of the large gear 90 which engages the end of a lever 111 on each rotation of the gear and of the shaft 24 so as to oscillate the lever about its pivot 112a which is stationary and carried by a portion of the frame of the machine. The other end of the lever 111 is offset at 112, as seen in Figure 16, and this offset portion is provided with a downturned end 113 which engages with a projection 114 carried at the end of one arm of a bell-crank lever 115. This lever is pivoted to a portion of the frame of the machine at 116 and its other arm has a slot 117 near its end for the accommodation of a pin 118 carried at one end of a link 119.

It will be seen that as the gear 90 rotates, the stud 110 oscillates the lever 111 for each revolution of the gear and of its shaft 24 so that the bell-crank lever 115 is also oscillated for each revolution of the shaft 24 and the link 119 is reciprocated, the link being returned to its original position by a spinrg 120 acting on the bell-crank lever 115. The reciprocations of the link 119, which are in synchronism with the operations in the machine, are communicated to the traveling belt or conveyor in a manner to cause an intermittent advancement of the belt or conveyor to move the tray which has been filled with matches away from the bed 31 and a new tray into position in front of said bed to receive matches projected therefrom. The link 119 is attached to a block 120a which works back and forth in the guideway 121 and carries a pawl 122 which is biased by a spring 123 (see Figure 2) so as to engage projections 124 on the interior side of the belt or conveyor. These projections are preferably curved or hooked as shown in Figure 2 so that the hooked end of the pawl 122 operatively engages one of the said projections during movement in one direction, but slides over the projection during movement in the other direction and, therefore, the reciprocations of the pawl are communicated to the conveyor as intermittent advancements thereof. These intermittent advancements of the conveyor serve to bring the trays one after the other in front of the bed 31 to receive the matches projected therefrom and the intermittent advancements are timed nicely with the movements of the carrier plate projecting the matches.

As shown in Figs. 3 and 7, the conveyor, where it passes the front of the bed, may be guided between the walls of a trough 125 which may be supported on the brackets 103 and on additional brackets 126 if desired.

After a tray has been filled with matches, the flap portion 107 of the cover or shuck is automatically turned down and sealed so that when the match box arrives at the pulley, ending its travel, it is complete and is filled with matches. As a means for automatically turning down the flaps of the shucks, we may provide the guide or trough 125 with rods 127 and 128 which are attached to the top of the trough and are adapted to act upon the flaps of the covers or shucks so as to turn them down as shown in Figures 9, 10 and 11. One of these rods 128 is positioned substantially horizontal and along the side of the path of travel of the conveyor and trays carried thereby while the other rod 127 extends diagonally across the path of travel and slopes downwardly as shown in Figure 7 so that it acts to gradually turn down the flaps into the position shown in Figure 11. In this position the flap is extending substantially horizontal and scrapes against a wheel 129 which applies adhesive material to it. This wheel 129 may be supported in a receptacle 130 as by a shaft 131 and in this receptacle there is a supply of adhesive material 132 which is picked up by the wheel and applied to the end of the flap of each cover or shuck as it passes or scrapes by the wheel. As the match box continues to travel past the wheel 129 the continued action of the rod 127 on the flap causes the end of the flap to be turned down as shown in Figure 12 and the shuck or cover thus sealed and completed. Thus, the article delivered by the conveyor is a complete match box filled with matches and ready for dispensation and sale.

The veneer pieces which are selected to be cut into matches and the cut matches projected and loaded into trays should preferably be of such a size that a single veneer when cut will give just enough matches to fill a tray. In other words, the charge of matches left upon the bed 31 when the carrier plate is retracted should be just large enough to nicely fill the tray into which they are projected on the advance of the carrier plate. It will be seen that all the operations of cutting the veneer pieces into matches, filling the trays with the matches, and closing down and sealing the covers or shucks on the trays are performed automatically and without the necessity of manual operation except for placing the veneer pieces in the machine, placing the trays and shucks with upstanding flaps on the conveyor and withdrawing the completed and filled match boxes from the conveyor. Thus, the machine is adapted to turn out and manufacture matches and fill match boxes therewith very quickly, economically and efficiently, and the apparatus described as the preferred form, is relatively quite simple.

By changing the cutting knives, different kinds of matches may be made on the same machine. The rearrangement of knives enables the cutting of any size matches, splints or combs of cardboard matches and, by variation in the sizes of the matches, a greater or less number of matches may be packed in the same size regulation boxes.

It will be appreciated that many changes and alterations in the exact constructions and arrangements shown may be resorted to without departing from the invention and we desire to be limited only by the state of the prior art and the scope of the appended claims.

What we claim is:—

1. A machine for manufacturing matches comprising a carrier, means for feeding veneers onto the carrier, means for cutting the veneers on the carrier into matches, and means for operating the carrier, said carrier remaining stationary during the feeding and cutting of the veneers and being moved after the cutting to carry the matches out of the machine.

2. A machine for manufacturing matches comprising a carrier, means for feeding veneers onto the carrier, means acting to bias the carrier to its retracted position, said carrier remaining stationary in its retracted position during the feeding of the veneers thereon, means for cutting the veneers into matches while the carrier is stationary, and means for moving the carrier to its advanced position after cutting of the veneers to carry the matches out of the machine.

3. A machine for manufacturing matches comprising a bed, a carrier movable over said bed, means for feeding veneers onto the carrier, said carrier remaining stationary while the veneers are fed thereon, means for cutting the veneers into matches while the carrier is stationary, and means for moving the carrier to its advanced position after cutting of the veneers, the matches being carried to the front of the bed and falling to the bed upon retraction of the carrier and in the path of the carrier when the latter is again advanced.

4. A machine for manufacturing matches comprising a carrier, means for feeding veneers onto the carrier, means for cutting the veneers on the carrier into matches, means for moving the carrier, said carrier remaining stationary during the feeding and cutting of the veneers and being moved after the cutting to carry the matches with it, a stopping element normally positioned above the carrier, and means for lowering said element against the carrier and in the path of the matches to sweep the matches from the carrier as the latter is retracted.

5. A machine for manufacturing matches comprising a horizontal platform on which veneers are stacked, a shuttle movable along said platform, means for operating the shuttle, a carrier, said shuttle acting to push and feed veneers from the bottom of the stack onto the carrier, said carrier being arranged in a horizontal plane and movable in a path substantially perpendicular to the path of movement of the shuttle, means for cutting the veneers on the carrier into matches, means for advancing the carrier after the veneers are cut to carry the matches with it, and an element adapted to be interposed in the path of the matches as the carrier is retracted to sweep the matches therefrom.

6. A machine for manufacturing matches comprising a bed, a carrier movable over said bed, means for feeding veneers onto the carrier, said carrier remaining stationary while the veneers are fed thereon, means for cutting the veneers into matches while the carrier is stationary, means for advancing and retracting the carrier, the matches being carried to the front of the bed upon advance of the carrier and falling to the bed upon retraction thereof and in the path of the carrier when the latter is again advanced to be projected thereby from the bed, a conveyor carrying trays arranged for receiving matches projected from the bed, and means for moving said conveyor intermittently in synchronism with the movements of the carrier whereby a fresh tray is in front of the bed upon each advance of the carrier.

7. A machine for manufacturing matches comprising a bed, a carrier movable over said bed, a horizontal slotted plate mounted over said carrier, under said slotted plate, means for cutting the veneers on the carrier into matches, means for moving the carrier, said carrier remaining stationary during the feeding and cutting of the veneers and being moved after the cutting to carry the matches with it, a stopping element normally positioned above the carrier, and means for lowering said element against the carrier and in the path of the matches to sweep the matches from the carrier as the latter is retracted.

8. A machine for manufacturing matches comprising a carrier in the form of a flat plate, means for feeding sheet match stock upon the carrier, means for cutting the stock on the carrier into matches, and means for operating the carrier acting to hold the carrier stationary during the feeding and cutting of the stock and being moved after the cutting to carry the matches out of the machine.

9. A machine for manufacturing matches comprising a bed, a carrier movable over said bed, means for feeding sheet stock upon the carrier, said carrier remaining stationary while the stock is fed thereon, means for cutting the stock into matches while the carrier is stationary, means for moving the carrier to its advanced position after cutting the stock, the matches being carried to the front of the bed and falling upon the bed at the retraction of the carrier and in the path of the carrier when the latter is again advanced, and a stop element movable behind the matches as the carrier is retracted.

In testimony whereof, we have signed our names to this specification this 15th day of May, 1928.

SAMUEL M. FRIEDE.
FRANK J. McGUIRE.